(12) United States Patent
Taira et al.

(10) Patent No.: US 11,092,496 B2
(45) Date of Patent: Aug. 17, 2021

(54) TEMPERATURE SENSOR AND MANUFACTURING METHOD OF TEMPERATURE SENSOR

(71) Applicant: SHIBAURA ELECTRONICS CO., LTD., Saitama (JP)

(72) Inventors: Masaki Taira, Iwate (JP); Yuuki Sato, Iwate (JP); Kazuaki Yano, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 120 days.

(21) Appl. No.: 16/588,248

(22) Filed: Sep. 30, 2019

(65) Prior Publication Data

US 2020/0264052 A1 Aug. 20, 2020

(51) Int. Cl.
| | |
|---|---|
| *G01K 1/00* | (2006.01) |
| *G01K 13/00* | (2021.01) |
| *G01K 7/00* | (2006.01) |
| *G01K 1/08* | (2021.01) |
| *G01K 7/02* | (2021.01) |

(52) U.S. Cl.
CPC ............... *G01K 1/08* (2013.01); *G01K 7/02* (2013.01); *G01K 2207/00* (2013.01)

(58) Field of Classification Search
USPC ............... 374/208, 141, 163, 142, 148
See application file for complete search history.

(56) References Cited

U.S. PATENT DOCUMENTS

| | | | | |
|---|---|---|---|---|
| 2005/0163192 A1* | 7/2005 | Usui | ............. | G01K 1/00 374/208 |
| 2007/0110124 A1* | 5/2007 | Shiraki | ............. | G01K 1/14 374/208 |
| 2009/0296782 A1* | 12/2009 | Nishiyashiki | ............. | G01K 1/14 374/208 |
| 2010/0195694 A1* | 8/2010 | Claassen | ............. | G01K 17/10 374/29 |
| 2013/0195144 A1* | 8/2013 | Hatano | ............. | G01K 1/14 374/208 |

FOREIGN PATENT DOCUMENTS

JP 2001-289695 A 10/2001

OTHER PUBLICATIONS

Translation of JP2001289695A (Year: 2001).*

* cited by examiner

*Primary Examiner* — Mirellys Jagan
(74) *Attorney, Agent, or Firm* — Pearne & Gordon LLP (57) ABSTRACT

Provided is a temperature sensor allowing a wire, which is an additional element, to be efficiently connected to the temperature sensor. The temperature includes the additional element and a temperature detecting element. The temperature detecting element includes a heat-sensitive body, a sensor element, and a protective tube. The sensor element has a pair of first electric wires which are electrically connected to the heat-sensitive body. The protective tube accommodates the sensor element. The additional element includes a terminal and a second electric wire that is electrically connected to the terminal. The terminal is responsible for electrical connection between the additional element and the protective tube, and for assembly where the additional element is mated with the protective tube. The terminal in the present invention has a passage which allows the first electric wires to pass therethrough.

17 Claims, 9 Drawing Sheets

TEMPERATURE SENSOR AND MANUFACTURING METHOD OF TEMPERATURE SENSOR

BACKGROUND OF THE INVENTION

Field of the Invention

The present invention relates to a temperature sensor which can detect a water temperature.

Description of the Related Art

In equipment, such as a dishwasher/dryer, a water heater, a washing machine, a dryer, and a bathtub, the temperature of water in a tank or another water storage tank is detected so as to control the equipment.

JP 2001-289695 A (Patent Document 1) discloses a water level-temperature detection sensor where a sensor which detects a water level and a sensor which detects a water temperature are formed as an integral body. This water level-temperature detection sensor includes a pair of electrodes constituting a water level sensor, and a holder which holds the pair of electrodes. One electrode of the water level sensor has a hollow structure, and a thermistor constituting the temperature sensor is incorporated in the hollow portion of the one electrode. Adopting this configuration allows the water level sensor and the temperature sensor to be formed into an integral body.

SUMMARY OF THE INVENTION

A wire provided for detecting a water level is connected to the temperature sensor disclosed in patent document 1 in addition to a pair of wires provided for detecting a water temperature. To prevent electrical leakage, there may be a case where a grounding wire is connected to the temperature sensor which detects a water temperature. The wire provided for detecting a water level and the grounding wire are considered to be additional elements for a sensor which detects only a temperature including a water temperature.

It is an object of the present invention to provide a temperature sensor allowing a wire, which is an additional element, to be efficiently connected to the temperature sensor.

A temperature sensor according to one aspect of the present invention includes an additional element and a temperature detecting element.

The temperature detecting element includes a heat-sensitive body, a sensor element, and a protective tube. The sensor element has a pair of first electric wires which are electrically connected to the heat-sensitive body. The protective tube accommodates the sensor element.

The additional element includes a terminal responsible for electrical connection between the additional element and the protective tube, and for assembly where the additional element is mated with the protective tube, and a second electric wire electrically connected to the terminal.

The terminal in the aspect of the present invention has a passage which allows either one of the protective tube or the first electric wire to pass through the passage from a side of the protective tube or a side of the first electric wire.

In the temperature sensor according to the aspect of the present invention, a size of the passage is preferably smaller than a size of a portion of the protective tube at a position where the terminal is mated with the protective tube.

In the temperature sensor according to the aspect of the present invention, the passage is preferably formed in the additional element so as to extend in a direction intersecting with a direction along which a second electric wire is led out.

In the temperature sensor according to the aspect of the present invention, the terminal preferably include a mating portion, the mating portion except for the passage surrounding the protective tube. The mating portion includes a crimping segment or a plurality of crimping segments on an inner peripheral surface which faces the protective tube, the crimping segment protruding toward the protective tube. The crimping segment is crimped to the protective tube so that the terminal is fixed to the protective tube.

In the temperature sensor according to the aspect of the present invention, the protective tube may include a pressing ring which is pressed against an equipment so as to fix the protective tube to the equipment. The pressing ring has a front end surface and a rear end surface. The front end surface comes into contact with the equipment. The rear end surface is disposed on a side opposite to the front end surface. The terminal is brought into surface contact with the rear end surface.

The present invention provides a method of manufacturing the above-mentioned temperature sensor. This manufacturing method includes a first step, a second step, and a third step.

In the first step, the terminal is disposed such that a position of the passage is aligned with the first electric wire.

In the second step, the protective tube and the terminal are brought close to each other until the first electric wire enters the mating portion of the terminal.

In the third step, the terminal is caused to move to a predetermined position on the protective tube in an axis line direction of the protective tube.

For the temperature sensor according to the aspect of the present invention, the terminal which is an additional element has the passage allowing the protective tube or the first electric wire of the temperature detecting element to pass therethrough. Accordingly, even if the first electric wire of the temperature detecting element has a long length, the protective tube or the first electric wire can be inserted into the terminal at a position in the vicinity of the heat-sensitive body. Therefore, compared with the case where the first electric wire is inserted into the terminal from the end of the first electric wire, the operation can be easily performed.

DETAILED DESCRIPTION OF THE PREFERRED EMBODIMENT

Hereinafter, a temperature sensor 1 according to one embodiment of the present invention will be described with reference to attached drawings. In the temperature sensor 1, an additional element 10 has a passage 15 and hence, the additional element 10 and a temperature detecting element 20 can be easily assembled with each other.

[Configuration of Temperature Sensor 1]

As shown in FIG. 1 and FIG. 2A to FIG. 2C, the temperature sensor 1 is formed by assembling the additional element 10 and the temperature detecting element 20 with each other.

[Additional Element 10]

The additional element 10 will be described with reference to FIG. 1 to FIG. 3A and FIG. 3B.

As shown in FIG. 1, FIG. 2A to FIG. 2C, FIG. 3A and FIG. 3B, the additional element 10 includes a terminal 11 and a second electric wire 19. The terminal 11 is responsible for the electrical connection of the additional element 10 with the temperature detecting element 20, and assembling of the additional element 10 to the temperature detecting element 20. The second electric wire 19 is electrically connected to the terminal 11. The additional element 10 can be used as a grounding wire, for example, and can be also used as a water level detecting electrode. In the case where the additional element 10 is used as the water level detecting electrode, it is necessary to provide another electrode. The usage of the additional element 10 is not limited to the above.

The terminal 11 may be made of a metal material having excellent conductivity and elasticity. For example, the terminal 11 may be made of a copper alloy, such as brass or phosphor bronze. A plate member made of one of these metal materials is stamped so that the terminal 11 is formed as an integral body.

The terminal 11 includes a mating portion 12 and a connection portion 16. The mating portion 12 is mated with the temperature detecting element 20. The connection portion 16 is continuously formed with the mating portion 12, and is connected with a lead wire. The side of the terminal 11 on which the mating portion is provided is defined as a front side (F10). The side of the terminal 11 on which the connection portion is provided is defined as a rear side (B10). This definition has a relative meaning.

Figure 3A:
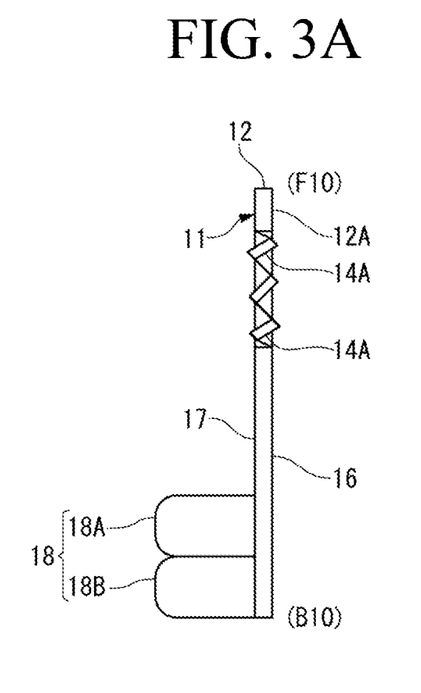
FIG. 3A and FIG. 3B each show a terminal of an additional element of the temperature sensor shown in FIG. 1 and FIG. 2A to FIG. 2C, FIG. 3A being a side view, and FIG. 3B being a front view.
Figure 3B:
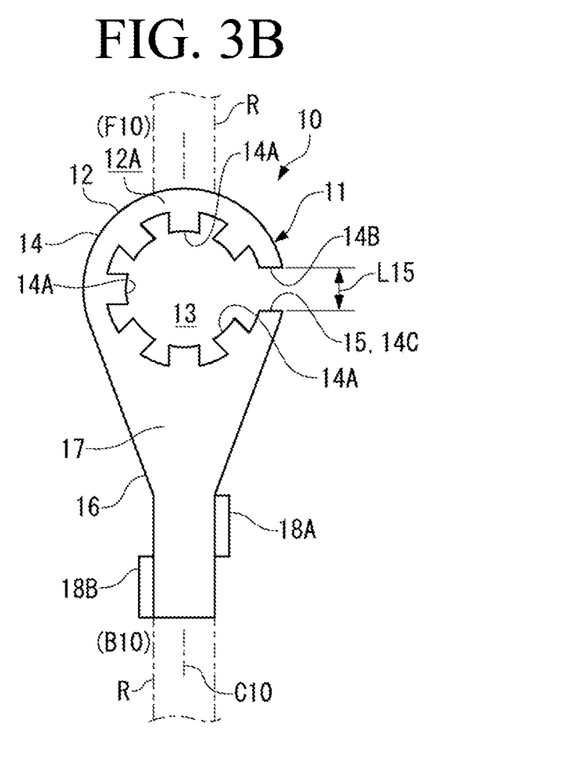

As shown in FIG. 3A and FIG. 3B, the mating portion has a mating space 13 and a holding ring 14. The temperature detecting element 20 is fitted in the mating space 13. The holding ring 14 surrounds the mating space 13. The mating portion 12 has a connecting surface 12A which is electrically connected with a pressing ring 37.

The mating space 13 has a circular shape so as to conform to the outer shape of the temperature detecting element 20. The holding ring 14 surrounds the mating space 13 having a circular shape, thus having an annular shape. However, a portion of the holding ring 14 is notched. This notched portion forms the passage 15. Lead wires 29, 29 of the temperature detecting element 20 (see FIG. 2A) pass through the passage 15 from the side when the additional element 10 is assembled to the temperature detecting element 20. The holding ring 14 except for the passage 15 surrounds a protective tube 31 which is fitted in the mating space 13. The inner peripheral surface of the holding ring 14 has a plurality of crimping segments 14A which are provided for ensuring mating strength of the holding ring 14 with respect to the temperature detecting element 20. The crimping segments 14A are provided so as to protrude toward the center of the mating space 13. FIG. 3A and FIG. 3B show a single terminal 11. The diameter of a circle formed by distal ends of all crimping segments 14A is set slightly smaller than the diameter of the outer periphery of the protective tube 31 with which the holding ring 14 is mated. With such a configuration, pressing the crimping segments 14A in an axis line direction C20 of the protective tube 31 allows the crimping segments 14A to be crimped to the protective tube 31. In this embodiment, an example is described where the plurality of crimping segments 14A are provided. However, only one crimping segment 14A may be provided as long as it fulfills the function on its own.

Figure 4:
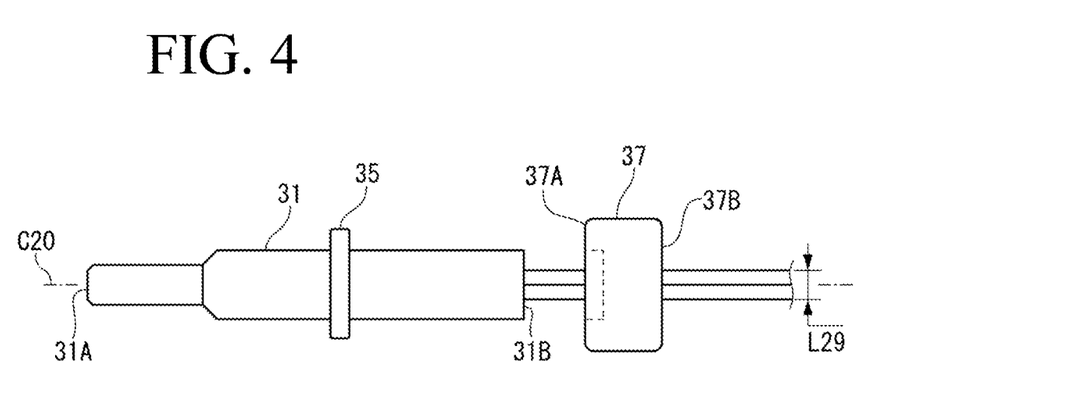
FIG. 4 is a side view showing the temperature detecting element of the temperature sensor shown in FIG. 1 and FIG. 2A to FIG. 2C.

As shown in FIG. 3A and FIG. 3B, a size L15 of the passage 15 is defined by a distance between one end 14B and the other end 14C of the holding ring 14 in the circumferential direction. The size L15 of the passage 15 is set sufficiently larger than a size L29 of the lead wires 29, 29 so as to allow the lead wires 29, 29 of the temperature detecting element 20 described later to pass through the passage 15. Further, as shown in FIG. 4, the size L29 is defined by the sum of the diameters of two lead wires 29. On the other hand, the size L15 of the passage 15 is set smaller than the outer diameter of the protective tube 31 at the position where the terminal 11 is mated with the protective tube 31. With such a configuration, after the terminal 11 is mated with the protective tube 31 at the predetermined position, it is difficult for the protective tube 31 to be removed from the terminal 11.

The passage 15 is formed to extend in a direction intersecting with an axis line direction C10 along which the second electric wire 19 is led out. More specifically, the passage 15 is formed to extend in a direction orthogonal to the axis line direction C10. The reason is as follows. The terminal 11 is formed by stamping a plate member. When the terminal 11 is formed, as shown in FIG. 3B, the terminal 11 is formed by cutting a runner R in a state where the terminal 11 is supported by a plate member via the runner R. In this process, if the passage 15 is formed so as to extend in the direction intersecting with the axis line direction C10, the passage 15 does not prevent the runner R from being provided. To the contrary, if the passage 15 is provided at the front end of the terminal 11, the runner R shown in the drawing cannot be provided.

This position of the passage 15 is preferable only from a viewpoint of a manufacturing step. In the present invention, it is also possible to provide the passage 15 at the front end of the terminal 11.

The connection portion 16 includes a core wire connection portion 17 and a coated fixing portion 18. A core wire 19A of the second electric wire 19 is electrically connected to the core wire connection portion 17. The coated fixing portion 18 fixes an insulation coating 19B of the second electric wire 19 by crimping. The core wire connection portion 17 has a flat plate shape where the size of the core wire connection portion 17 in the width direction reduces from the mating portion 12 toward the rear side (B10). The coated fixing portion 18 is continuously formed with the core wire connection portion 17, and has the same width as the rear end portion of the core wire connection portion 17. A crimping segment 18A and a crimping segment 18B are provided on both sides of the coated fixing portion 18 in the width direction. As shown in FIG. 2B, the crimping segment 18A and the crimping segment 18B are provided at different positions in the axis line direction C20 (see FIG. 2A).

The second electric wire 19 includes the core wire 19A, and the insulation coating 19B which surrounds the circumference of the core wire 19A. At the front end of the second electric wire 19, the insulation coating 19B is removed so that the core wire 19A is exposed.

The second electric wire 19 is connected to the terminal 11 via the connection portion 16. Specifically, a splice terminal 19C is mounted on the distal end of the exposed core wire 19A of the second electric wire 19, and this splice terminal 19C is connected to the core wire connection portion 17 by, for example, welding. With such a configuration, the core wire 19A is electrically connected to the core wire connection portion 17. Further, at the coated fixing portion 18 which is disposed rearward of the core wire connection portion 17, the insulation coating 19B of the second electric wire 19 is crimped by the bent crimping segments 18A, 18B so that the second electric wire 19 is fixed to the terminal 11.

[Temperature Detecting Element 20]

Next, the temperature detecting element 20 will be described.

As shown in FIG. 1, FIG. 2A to FIG. 2C and FIG. 4, the temperature detecting element 20 includes a sensor element 21, the protective tube 31, and a filler 41. The protective tube 31 accommodates the main portion of the sensor element 21. The filler 41 fills a space formed between the sensor element 21 and the protective tube 31.

The sensor element 21 includes a heat-sensitive body 23, a protective layer 25, a pair of lead-out wires 27, 27, and the lead wires 29, 29. The protective layer 25 made of glass covers the circumference of the heat-sensitive body 23. The pair of lead-out wires 27, 27 are electrically connected to the heat-sensitive body 23. The lead wires 29, 29 are respectively connected to the lead-out wires 27, 27. The lead-out wires 27, 27 and the lead wires 29, 29 form a pair of first electric wires. The side of the temperature detecting element 20 on which the heat-sensitive body 23 is provided is defined as a front side (F20). The side of the temperature detecting element 20 from which the lead wire 29 is led out is defined as a rear side (B20). This definition has a relative meaning.

[Heat-Sensitive Body]

A thermistor may be used for the heat-sensitive body 23, for example. The term "thermistor" is the abbreviation for thermally sensitive resistor. The thermistor is a metal oxide which measures a temperature by making use of a phenomenon that electrical resistance varies depending on a temperature.

Thermistors are classified into NTC (negative temperature coefficient) thermistors and PTC (positive temperature coefficient) thermistors. Either one of thermistors can be used for the heat-sensitive body 23.

As an NTC thermistor, an oxide sintered body containing a manganese oxide ($Mn_3O_4$), which has a typical spinel structure, as a basic composition may be used for the heat-sensitive body 23. An oxide sintered body having the composition of $M_xMn_3O_4$ obtained by adding an M element (one or more elements selected from Ni, Co, Fe, Cu, Al and Cr) to this basic configuration may be used for the heat-sensitive body 23. One or more elements selected from V, B, Ba, Bi, Ca, La, Sb, Sr, Ti and Zr may also be added.

As a PTC thermistor, an oxide sintered body containing a compound oxide, for example, $YCrO_3$, having a typical perovskite structure as a basic configuration may be used for the heat-sensitive body 23.

[Protective Layer 25]

The protective layer 25 made of glass seals the heat-sensitive body 23, thus maintaining the heat-sensitive body 23 in an airtight state. Accordingly, the protective layer 25 prevents the heat-sensitive body 23 from being chemically or physically changed due to environmental conditions, and the protective layer 25 protects the heat-sensitive body 23 mechanically. The protective layer 25 made of glass covers, in addition to the entire heat-sensitive body 23, the front ends of the lead-out wires 27, 27, and seals the lead-out wires 27, 27.

Providing the protective layer 25 made of glass merely forms a preferred example of this embodiment. It is optional to provide the protective layer 25.

[Lead-Out Wire 27]

The lead-out wires 27, 27 are electrically connected to the electrodes of the heat-sensitive body 23 not shown in the drawing.

The lead-out wires 27, 27 are sealed by the protective layer 25 and hence, a dumet wire is used for the lead-out wires 27, 27. The dumet wire has a linear expansion coefficient similar to the linear expansion coefficient of glass. The dumet wire is a wire where an alloy containing iron and nickel as main components is used as a conductor (core wire), and the circumference of the conductor is coated by copper. A conductor of the lead-out wires 27, 27 is exposed and hence, entering of moisture may cause short-circuiting.

[Lead Wire 29]

Figure 1:
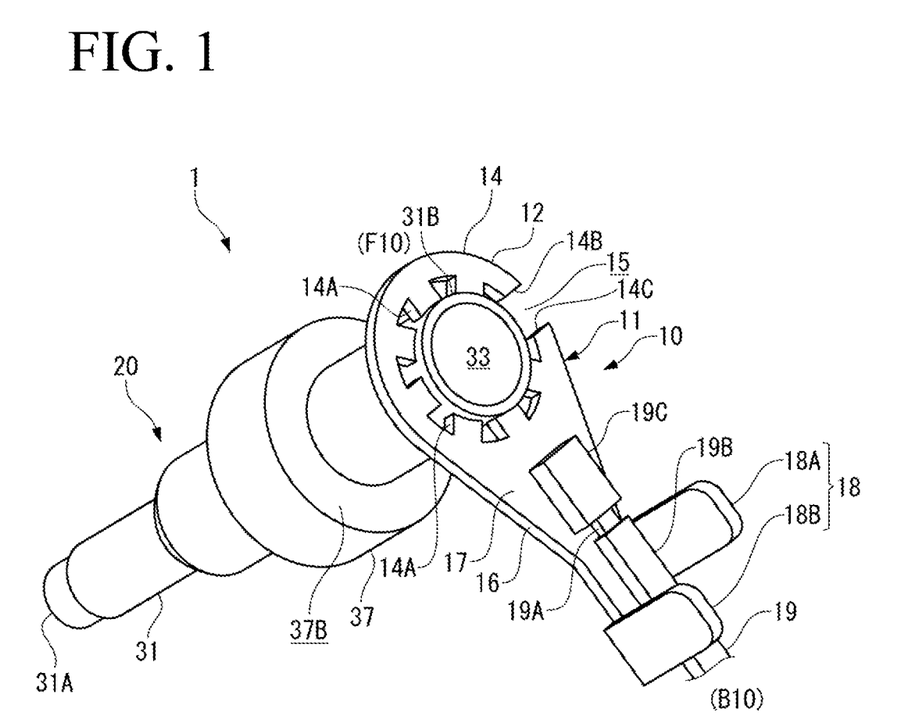
FIG. 1 is a perspective view showing a temperature sensor according to one embodiment of the present invention with lead wires of a temperature detecting element omitted.
Figure 2A:
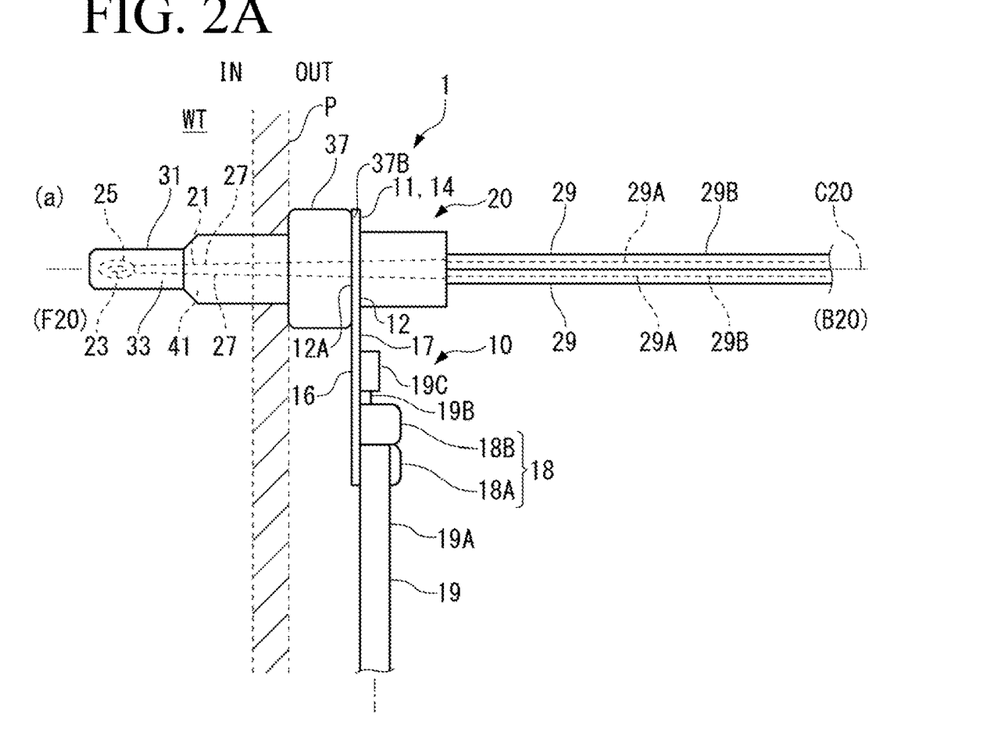
FIG. 2A, FIG. 2B and FIG. 2C each show the temperature sensor shown in FIG. 1, FIG. 2A being a side view, FIG. 2B being a front view, and FIG. 2C being a front view.
Figure 2B:
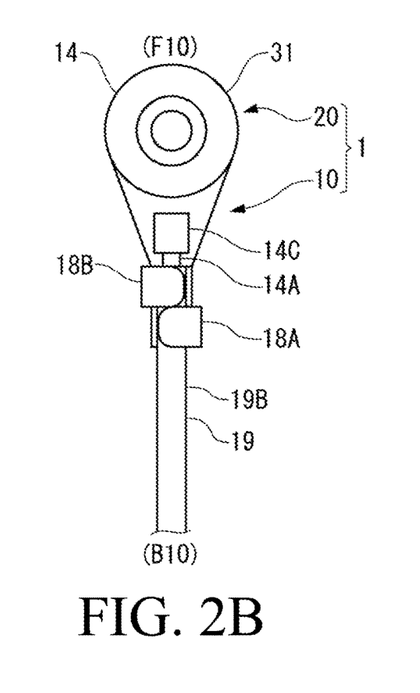
Figure 2C:
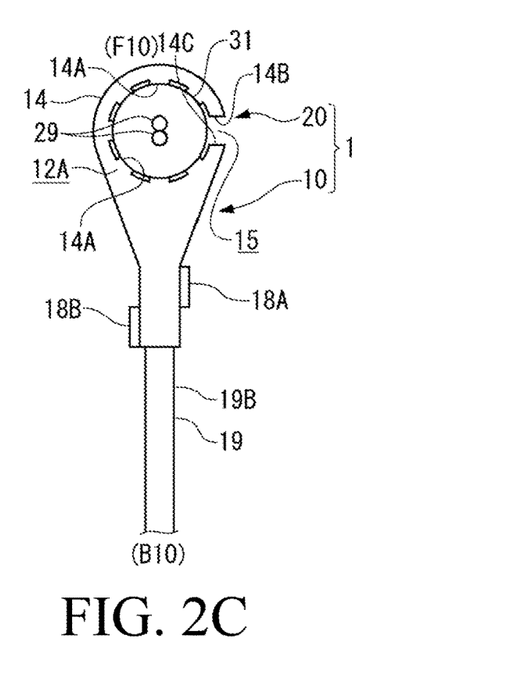

As shown in FIG. 2A, the lead wires 29, 29 include core wires 29A, 29A and insulation coatings 29B, 29B. The core wires 29A, 29A are made of a conductor. The insulation coatings 29B, 29B cover the core wires 29A, 29A. The core wires 29A, 29A of the lead wires 29, 29 are electrically connected to the lead-out wires 27, 27 by welding, a conductive adhesive agent or the like.

[Protective Tube 31]

As shown in FIG. 1, FIG. 2A to FIG. 2C and FIG. 4, the protective tube 31 may be made of a metal material which covers a range from the front end of the sensor element 21 to portions of the lead wires 29, 29. Specifically, since the protective tube 31 is exposed to water which is an object to be measured and hence, the protective tube 31 may be made of stainless steel. The protective tube 31 is made of a metal material having high thermal conductivity for the purpose of quick transmission of the temperature of the surrounding environment into the protective tube 31, in addition to protection of the sensor element 21 accommodated in the protective tube 31 from the surrounding environment.

The protective tube 31 is a cylindrical member having a closed front end 31A and an open rear end 31B. An accommodation chamber 33 is formed in the protective tube 31, and the sensor element 21 is disposed in the accommodation chamber 33.

The protective tube 31 is formed such that the diameter of the protective tube 31 gradually reduces from the rear end 31B toward the front end 31A. The heat-sensitive body 23 of the sensor element 21 is disposed in the protective tube 31 at a position on the front-end-31A side where the protective tube 31 has the smallest diameter.

A flange 35 having an annular shape is provided at substantially the center of the protective tube 31 in the axis line direction C20. The flange 35 is formed to protrude in a flange shape in a radial direction. The flange 35 is used for positioning the pressing ring 37 which will be described next. The flange 35 is formed as a separate body and, thereafter, is fixed to a predetermined position on the outer periphery of the protective tube 31 by welding or other means. The pressing ring 37 has a front end surface 37A and a rear end surface 37B.

As shown in FIG. 2A, the pressing ring 37 is mated with the outer periphery of the protective tube 31 at the predetermined position. Further, the terminal 11 of the additional element 10 is caused to abut against the rear end surface 37B of the pressing ring 37. The pressing ring 37 may be made of a similar or same copper alloy as the terminal 11.

In the case where the temperature sensor 1 is installed in equipment having a water storage tank WT, the pressing ring 37 is fixed with the front end surface 37A brought into contact with a partition P between the inner side IN and the outer side OUT of the water storage tank WT. The pressing ring 37 is fixed to the partition P on the outer side OUT of the water storage tank WT. Further, the terminal 11 of the additional element 10 of the temperature sensor 1 is fixed to the protective tube in a state where the terminal 11 is brought into surface contact with the rear end surface 37B of the pressing ring 37.

As described above, the pressing ring 37 has a function of positioning the temperature sensor 1 with respect to the partition P, and a function of positioning the terminal 11 with respect to the protective tube 31.

[Filler 41]

The filler 41 fills a clearance formed between the sensor element 21 and the protective tube 31, thus supporting the sensor element 21 in the protective tube 31. The filler 41 is made of an epoxy resin, for example. The filler 41 is bonded to the sensor element 21 with an adhesive force, and the filler 41 is bonded to the inner wall of the protective tube 31 with an adhesive force. With such a configuration, a water entry path is not easily formed in the protective tube 31.

The filler 41 is provided within a predetermined range starting from the front end 31A of the protective tube 31.

[Procedure for Assembling Temperature Sensor 1]

The temperature sensor 1 is manufactured by assembling the additional element 10 and the temperature detecting element 20. A procedure for manufacturing the temperature sensor 1 will be described with reference to FIG. 5A and FIG. 5B, FIG. 6A and FIG. 6B. Elements which are not necessary for the description of the procedure for assembling are omitted from FIG. 5A and FIG. 5B, FIG. 6A and FIG. 6B.

This procedure for assembling the temperature sensor 1 includes a first step, a second step, and a third step. In the first step, the terminal 11 is positioned with respect to the lead wires 29, 29. In the second step, the lead wires 29, 29 are caused to enter the mating space 13 of the terminal 11. In the third step, the terminal 11 is caused to move so as to abut against the pressing ring 37.

[First Step]

Figure 5A:
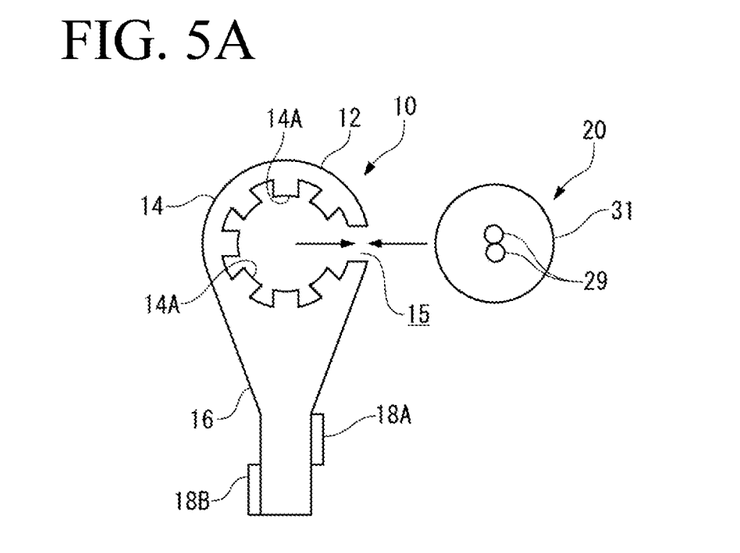
FIG. 5A and FIG. 5B are front views showing a procedure for assembling the additional element and the temperature detecting element of the temperature sensor shown in FIG. 1 and FIG. 2A to FIG. 2C.

In the first step, as shown in FIG. 5A, the additional element 10 and the temperature detecting element 20 are positioned such that the position of the passage 15 of the terminal 11 is aligned with the lead wires 29, 29 of the temperature detecting element 20. This positioning means that the lead wires 29, 29 fall within a range between the one end 14B and the other end 14C of the holding ring 14. As described above, the size L15 of the passage 15 is sufficiently larger than the size L29 of the lead wires 29, 29. Accordingly, it is possible to allow the lead wires 29, 29 to pass through the passage 15 without any difficulty.

[Second Step]

Figure 5B:
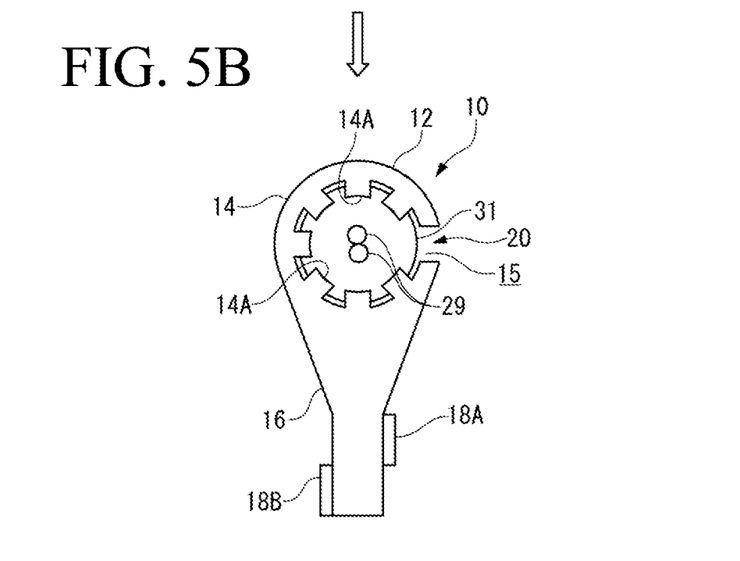
Figure 6A:
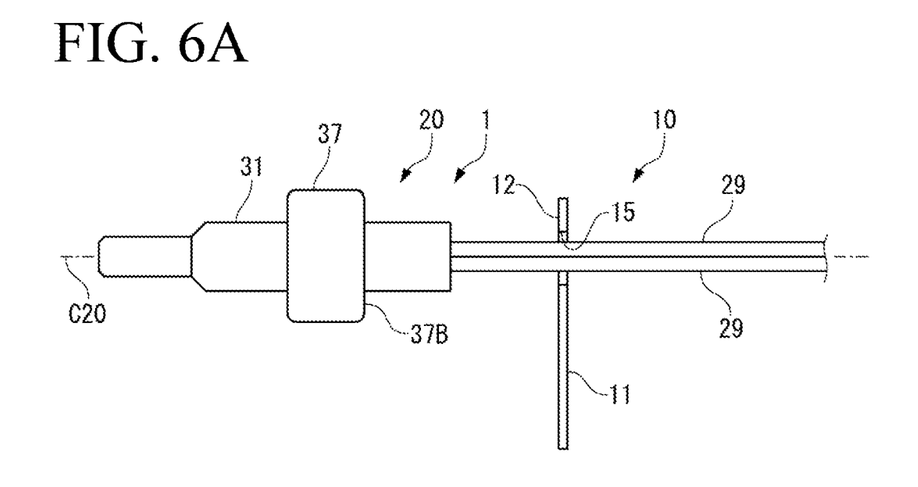
FIG. 6A and FIG. 6B are side views showing a procedure for assembling the additional element and the temperature detecting element of the temperature sensor shown in FIG. 1 and FIG. 2A to FIG. 2C.

After the lead wires 29, 29 are positioned with respect to the passage 15, the additional element 10 and the temperature detecting element 20 are then brought close to each other. Such an approaching operation is continued until the lead wires 29, 29 enter the mating space 13 of the terminal 11 as shown in FIG. 5B. At this point of operation, as shown in FIG. 6A, the terminal 11 is separated from the protective tube 31 in the axis line direction C20.

[Third Step]

Figure 6B:
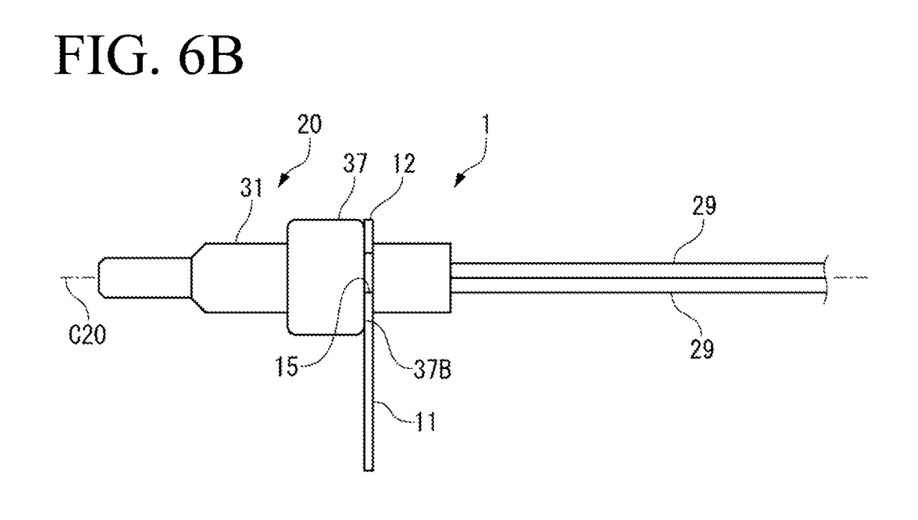

The lead wires 29, 29 are caused to enter the mating space 13 of the terminal 11 and, thereafter, the terminal 11 is moved toward the protective tube 31. The terminal 11 is moved until the mating portion 12 of the terminal 11 is mated with the protective tube 31, and the mating portion 12 abuts against the rear end surface 37B of the pressing ring 37 as shown in FIG. 6B. After the mating portion 12 abuts against the rear end surface 37B, a force in the axis line direction C20 is applied to the crimping segments 14A, thus causing the crimping segments 14A to be crimped to the outer peripheral surface of the protective tube 31. To cause the crimping segments 14A to be crimped to the outer peripheral surface of the protective tube 31, it is sufficient to push an annular jig toward the pressing ring 37. With such an operation, the movement of the terminal 11 toward the pressing ring 37 and fixing of the terminal 11 to the protective tube 31 can be performed by one operation of pushing the jig.

[Advantageous Effects of Temperature Sensor 1]

The temperature sensor 1 which is formed through the above-mentioned respective steps has the following advantageous effects.

The temperature sensor 1 is formed through a simple step where the mating portion 12 of the terminal 11 is mated with the protective tube 31, and the crimping segments 14A are crimped to the protective tube 31.

Further, in the temperature sensor 1, the lead wires 29, 29 are allowed to enter the mating space 13 through the passage 15 of the mating portion 12. Assume a case where the passage 15 is not provided so that the entire area of the mating space 13 in the circumferential direction is closed by the mating portion 12. In such a case, to dispose the lead wires 29, 29 in the mating space 13, it is necessary to insert the lead wires 29, 29 into the mating portion 12 from the ends of the lead wires 29, 29. In the case where the size from the ends of the lead wires 29, 29 to the protective tube 31 is large, a long time is required for moving the terminal 11 to the protective tube 31 after the ends of the lead wires 29, 29 are inserted into the terminal 11. In such a case, a long time is required for forming a temperature sensor, thus increasing a manufacturing cost. To the contrary, according to this embodiment, the lead wires 29, 29 are allowed to be disposed in the mating space 13 at a position close to the protective tube 31 and hence, mounting can be easily performed, and it is possible to reduce a manufacturing cost.

A fixing force of the terminal 11 with respect to the protective tube 31 increases as the size of the mating portion 12 which surrounds the protective tube 31 increases. The passage 15 does not contribute to the fixing force of the terminal 11 with respect to the protective tube 31. It is sufficient that the passage 15 has a sufficient width with respect to the lead wires 29, 29. That is, according to this embodiment, the lowering of the fixing force of the terminal 11 with respect to the protective tube 31 can be suppressed at the minimum level.

Next, the terminal 11 of the temperature sensor 1 is fixed such that the terminal 11 comes into contact with the rear end surface 37B of the pressing ring 37. Assume a case where the terminal 11 is fixed such that the terminal 11 comes into contact with the front end surface 37A of the pressing ring 37. In this case, if water leaks from a space formed between the water storage tank WT and the protective tube 31, the terminal 11 gets wet. To prevent such a case, a robust seal structure is required. On the other hand, in the temperature sensor 1, the pressing ring 37 is interposed between the terminal 11 and the partition P. Accordingly, even if water leaks, there is a low possibility of the terminal 11 getting wet.

Further, in the temperature sensor 1, the outer peripheral surface of the protective tube 31 and the inner peripheral surface of the pressing ring 37 are electrically connected with each other. In addition to the above, the rear end surface 37B of the pressing ring 37 and the connecting surface 12A of the mating portion of the terminal 11 are electrically connected with each other. The latter electrical connection is a contact between surfaces, thus having a large contact area. Accordingly, it is possible to ensure a sufficient electrical path as the additional element 10.

The present invention is not limited to the above-mentioned configuration. The configuration described in the above-mentioned embodiment may be selectively used, or changed to another configuration when necessary without departing from the spirit of the present invention. That is, the present invention is characterized by providing a passage, which allows wires to pass therethrough, to the terminal as an additional element. Accordingly, other configurations, such as the shape of the terminal or the shape of the protective tube, should be determined depending on the structure or the like of members disposed around the temperature sensor.

Figure 7A:
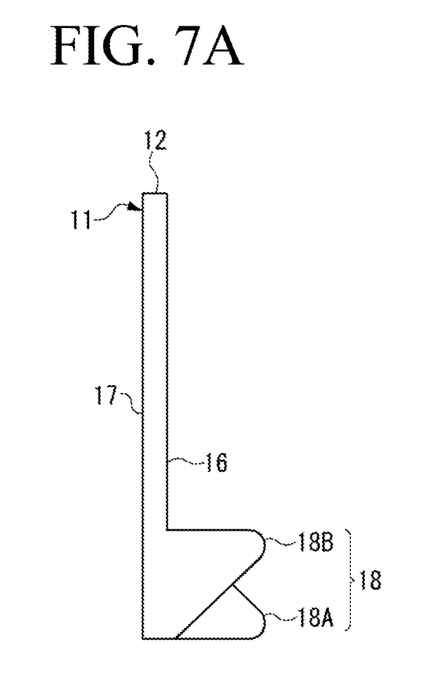
FIG. 7A, FIG. 7B and FIG. 7C are three drawings showing the modification of the additional element.
Figure 7B:
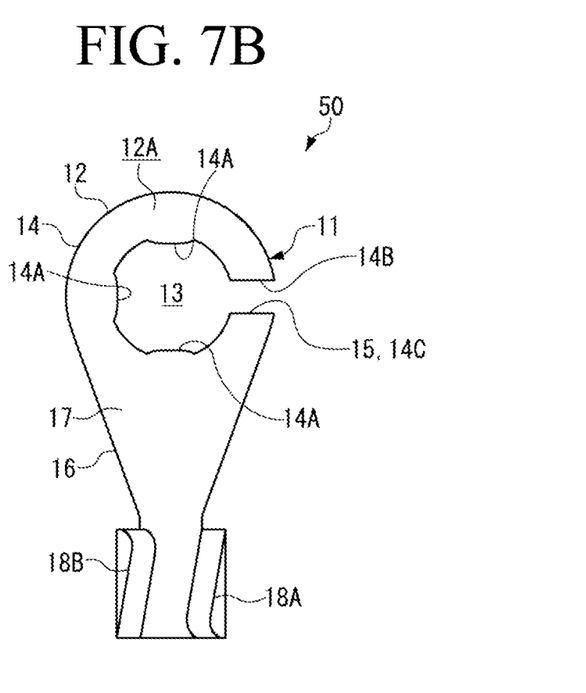
Figure 7C:
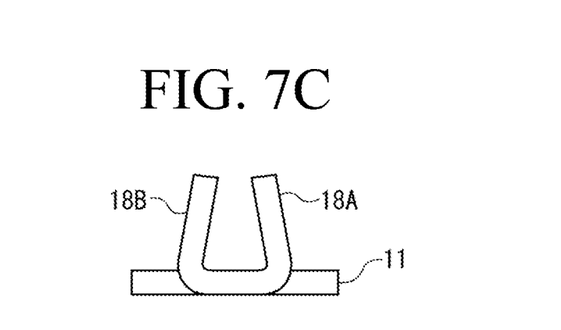
Figure 8A:
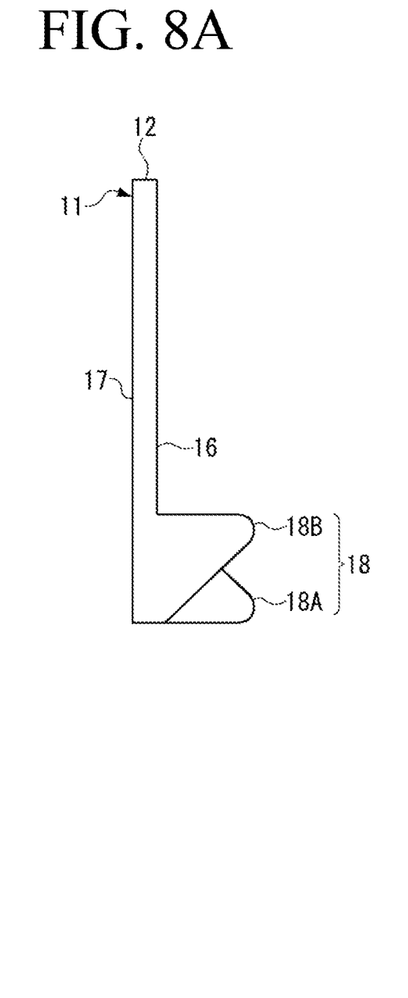
FIG. 8A, FIG. 8B and FIG. 8C are three drawings showing another modification of the additional element.
Figure 8B:
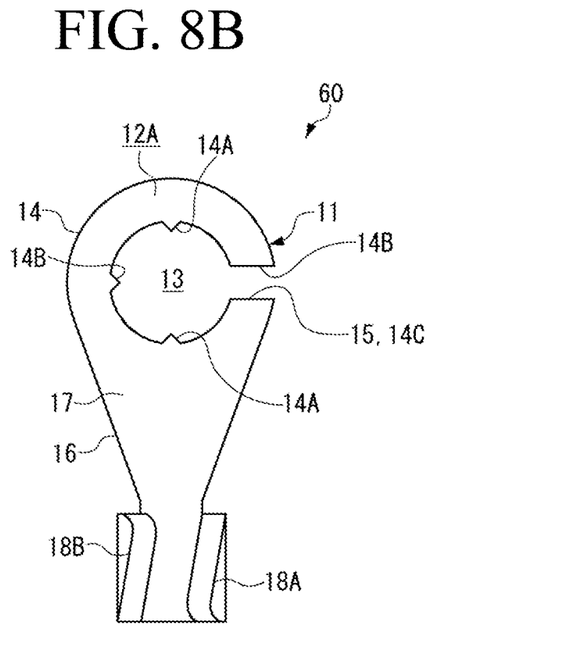
Figure 8C:
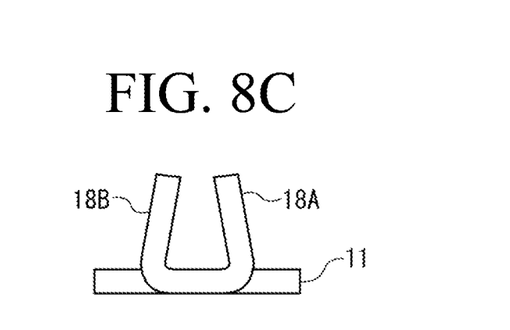

For example, the present invention can employ the mode shown in FIG. 7A to FIG. 7C or the mode shown in FIG. 8A to FIG. 8C for the crimping segment 14A of the holding ring 14. In an additional element 50 shown in FIG. 7A to FIG. 7C, crimping segments 14A protrude toward the mating space 13, and have an arc shape. In an additional element 60 shown in FIG. 8A to FIG. 8C, the crimping segments 14A protrude toward the mating space 13, and have a triangular shape. The crimping segments 14A shown in FIG. 7A to FIG. 7C and the crimping segments 14A shown in FIG. 8A to FIG. 8C have a smaller protruding amount toward the mating space 13 than the crimping segments 14A shown in FIG. 1, FIG. 3A and FIG. 3B. Further, the number of crimping segments 14A shown in FIG. 7A to FIG. 7C and the number of crimping segments 14A shown in FIG. 8A to FIG. 8C are smaller than the number of crimping segments 14A shown in FIG. 1, FIG. 3A and FIG. 3B. However, by ensuring rigidity of the holding ring 14, which supports the crimping segments 14A, it is possible to acquire sufficient mating force with respect to the temperature detecting element 20.

The present invention can employ the mode shown in FIG. 7A to FIG. 7C or the mode shown in FIG. 8A to FIG. 8C for the crimping segments 18A, 18B of the coated fixing portion 18. Each of the crimping segments 18A, 18B shown in FIG. 7A to FIG. 7C and the crimping segments 18A, 18B shown in FIG. 8A to FIG. 8C has a triangular plane. With such a configuration, the size in the axis line direction of each of the crimping segments 18A, 18B which crimps the second electric wire 19 can be set longer than that of the crimping segment having a rectangular plane shown in FIG. 3A and FIG. 3B.

Figure 9A:
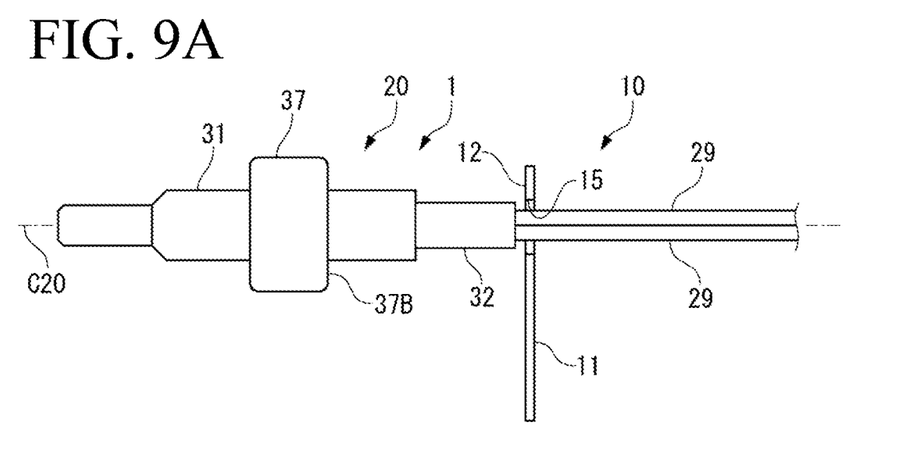
FIG. 9A and FIG. 9B are views showing a modification of this embodiment, and are also views which correspond to FIG. 6A and FIG. 6B.
Figure 9B:
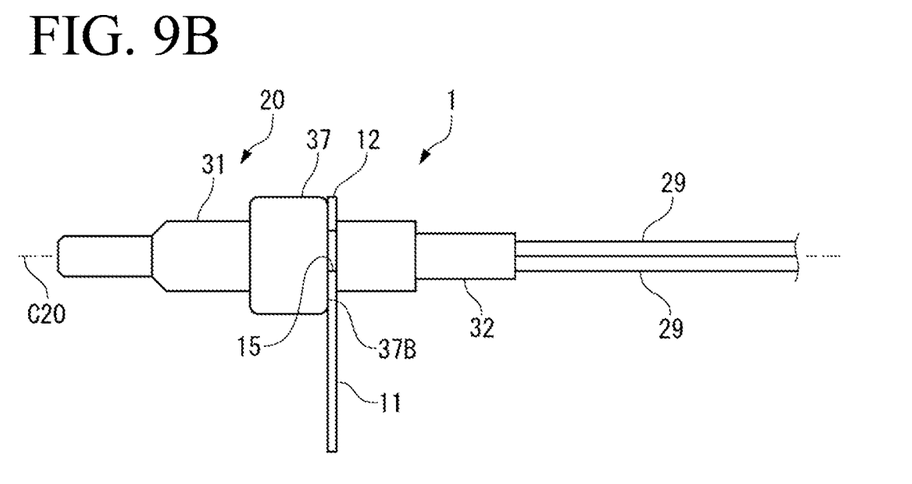

In the above-mentioned mode, an example has been described where the passage 15 of the terminal 11 allows the lead wires 29, 29 to pass therethrough. However, the present invention is not limited to such an example. For example, as shown in FIG. 9A and FIG. 9B, in the case where a small diameter portion 32 is formed on the rear side of the protective tube 31, the passage 15 may allow the small diameter portion 32 to pass therethrough.

What is claimed is:

1. A temperature sensor comprising:
 a temperature detecting element; and
 an additional element, wherein
 the temperature detecting element includes a heat-sensitive body, a sensor element, and a protective tube accommodating the sensor element, the sensor element having a pair of first electric wires which are electrically connected to the heat-sensitive body,
 the additional element includes a terminal and a second electric wire, the terminal being responsible for electrical connection between the additional element and the protective tube, and for assembly where the additional element is mated with the protective tube, the second electric wire being electrically connected to the terminal, and
 the terminal has a passage which allows either one of the protective tube or the first electric wires to pass through the passage from a side of the protective tube or a side of the first electric wires.

2. The temperature sensor according to claim 1, wherein the terminal includes a mating portion, the mating portion except for the passage surrounding the protective tube, the mating portion includes at least one crimping segment on an inner peripheral surface which faces the protective tube, the at least one crimping segment protruding toward the protective tube, and the crimping segment is crimped to the protective tube so that the terminal is fixed to the protective tube.

3. The temperature sensor according to claim 1, wherein the protective tube includes a pressing ring which is pressed against an equipment so as to fix the protective tube to the equipment,
 the pressing ring has a front end surface and a rear end surface, the front end surface coming into contact with the equipment, and the rear end surface being disposed on a side opposite to the front end surface, and
 the terminal is brought into surface contact with the rear end surface of the pressing ring.

4. The temperature sensor according to claim 1, wherein the passage is a notch.

5. The temperature sensor according to claim 1, wherein the terminal comprises a conductive material.

6. The temperature sensor according to claim 1, wherein the terminal comprises a holding ring that is configured to receive the protective tube therethrough, the holding ring comprising a conductive material.

7. The temperature sensor according to claim 1, wherein the terminal is electrically connected to the protective tube.

8. The temperature sensor according to claim 1, wherein the protective tube accommodates the heat-sensitivity body.

9. The temperature sensor according to claim 1, wherein the terminal defines a mating space configured to receive the protective tube therethrough, the passage intersecting with and extending from the mating space.

10. A method of manipulating the temperature sensor according to claim 1, the terminal including a mating portion, the mating portion except for the passage surrounding the protective tube, the method comprising:
   providing the temperature sensor;
   a first step where the terminal is disposed such that a position of the passage is aligned with the first electric wires;
   a second step where the protective tube and the terminal are brought close to each other until the first electric wires enter the mating portion of the terminal; and
   a third step where the terminal is caused to move to a predetermined position on the protective tube in an axis line direction of the protective tube.

11. The temperature sensor according to claim 1, wherein the passage is formed in the additional element so as to extend in a direction intersecting with a direction along which the second electric wire is led out.

12. The temperature sensor according to claim 11, wherein
   the terminal includes a mating portion, the mating portion except for the passage surrounding the protective tube,
   the mating portion includes at least one crimping segment on an inner peripheral surface which faces the protective tube, the at least one crimping segment protruding toward the protective tube, and
   the crimping segment is crimped to the protective tube so that the terminal is fixed to the protective tube.

13. A method of manipulating the temperature sensor according to claim 11, the terminal including a mating portion, the mating portion except for the passage surrounding the protective tube, the method comprising:
   providing the temperature sensor;
   a first step where the terminal is disposed such that a position of the passage is aligned with the first electric wires;
   a second step where the protective tube and the terminal are brought close to each other until the first electric wires enter the mating portion of the terminal; and
   a third step where the terminal is caused to move to a predetermined position on the protective tube in an axis line direction of the protective tube.

14. The temperature sensor according to claim 1, wherein a size of the passage is smaller than a size of a portion of the protective tube at a position where the terminal is mated with the protective tube.

15. The temperature sensor according to claim 14, wherein
   the passage is formed in the additional element so as to extend in a direction intersecting with a direction along which the second electric wire is led out.

16. The temperature sensor according to claim 14, wherein
   the terminal includes a mating portion, the mating portion except for the passage surrounding the protective tube,
   the mating portion includes at least one crimping segment on an inner peripheral surface which faces the protective tube, the at least one crimping segment protruding toward the protective tube, and
   the crimping segment is crimped to the protective tube so that the terminal is fixed to the protective tube.

17. A method of manipulating the temperature sensor according to claim 14, the terminal including a mating portion, the mating portion except for the passage surrounding the protective tube, the method comprising:
   providing the temperature sensor;
   a first step where the terminal is disposed such that a position of the passage is aligned with the first electric wires;
   a second step where the protective tube and the terminal are brought close to each other until the first electric wires enter the mating portion of the terminal; and
   a third step where the terminal is caused to move to a predetermined position on the protective tube in an axis line direction of the protective tube.

* * * * *

UNITED STATES PATENT AND TRADEMARK OFFICE
CERTIFICATE OF CORRECTION

PATENT NO. : 11,092,496 B2
APPLICATION NO. : 16/588248
DATED : August 17, 2021
INVENTOR(S) : Taira et al.

Page 1 of 1

It is certified that error appears in the above-identified patent and that said Letters Patent is hereby corrected as shown below:

On the Title Page

Before item (51) Int. Class, the following section should appear:
--(30) Foreign Application Priority Data
February 15, 2019 (JP) .................................. 2019-025029
August 6, 2019 (JP) ................................. 2019-144198--.

In the Specification

Column 3, Line 56, "mating portion is provided" should read --mating portion 12 is provided--.

Column 3, Line 58, "portion is provided" should read --portion 16 is provided--.

Column 3, Line 60, "mating portion has" should read --mating portion 12 has--.

Column 7, Line 25, "protective tube in a state" should read --protective tube 31 in a state--.

Column 9, Line 22, "mating portion of the" should read --mating portion 12 of the--.

Signed and Sealed this
Twenty-eighth Day of June, 2022

Katherine Kelly Vidal
*Director of the United States Patent and Trademark Office*